Dec. 24, 1963     E. F. HOHWART     3,115,356
SELF POSITIONING ACCURATELY REMOUNTABLE DOWELL
Filed May 31, 1960
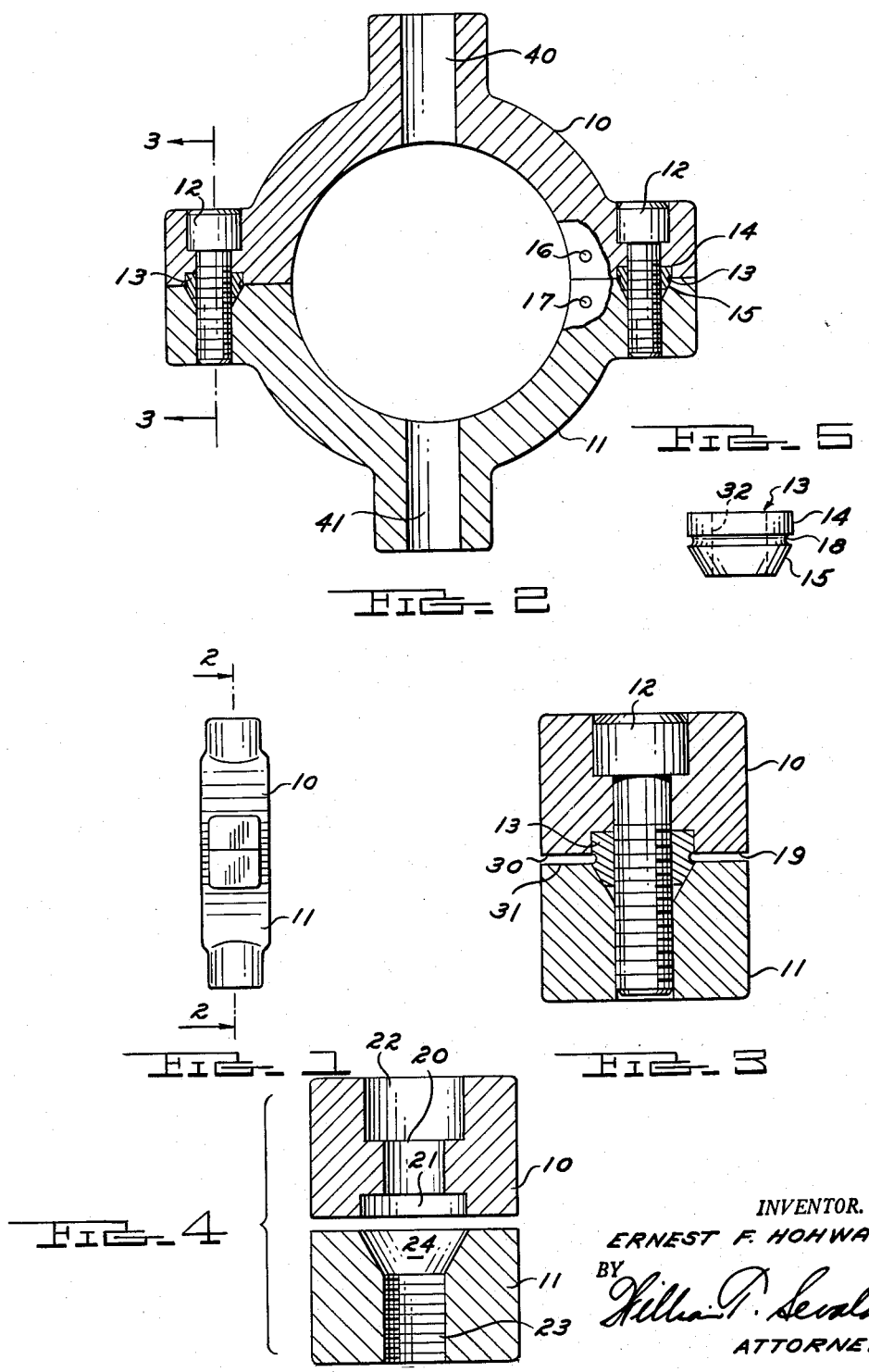
INVENTOR.
ERNEST F. HOHWART
BY
ATTORNEY United States Patent Office 3,115,356
Patented Dec. 24, 1963

3,115,356
SELF POSITIONING ACCURATELY
REMOUNTABLE DOWELL
Ernest F. Hohwart, 19381 Sussex Ave., Detroit 35, Mich.
Filed May 31, 1960, Ser. No. 33,007
4 Claims. (Cl. 287—127)

The invention relates to a moldable conforming dowel for accurately locating and re-locating parts in identical relationship upon disassembly and reassembly.

Various type fitting and locating means have been employed heretofore to facilitate accurately locating parts relative to one another so that they can be disassembled and reassembled in accurate alignment, however, the several devices prior however have not proven entirely satisfactory inasmuch as they are complicated in design and construction, expensive to manufacture, difficult to use, and not sufficiently accurate to re-establish the pieces in the identical initial assembled relationship.

With the foregoing in view, the primary object of the invention is to provide a precision fitting, locating, and accurate re-locating dowel which is self-adjusting for compensating differences and variances between adjacent parts, which is simple in design and construction, inexpensive to manufacture, easy to use, easy to disassemble in conjunction with adjacent parts and entirely accurate in re-establishing the reassembled parts in their initial identical relationship.

An object of the invention is to provide a pressure moldable dowel which is forced into conforming relationship with part differences and variances upon the initial location so that all differences and variances between the parts, the part's sockets, and the dowel are ironed out by the flow of the dowel material in pressure molding.

An object of the invention is to provide a head on the dowel which will imbed itself in one part in fixed relationship thereto so that it stays in fixed relationship to that part upon disassembly.

An object of the invention is to provide a tapered shoulder on the dowel for easy disassembly and disconnection from the part with which it is associated when the parts of disassembled.

An object of the invention is to provide a dowel having an aperture for receiving a bolt therethrough so that the dowel is not only pressure molded relative to the parts but also relative to the connecting bolt.

An object of the invention is to provide an interlocking draft in one part for use in conjunction with dowel head for fixedly connecting the dowel to that particular part.

An object to the invention is to provide a dowel, which can be placed in sockets of adjacent parts spaced from the bolt or other connecting means for accurate disassembly and reassembly which is fixably moldable in one part and detachably molded in the other part.

These and other objects in the invention will become apparent by the reference to the following description of a dowel embodying the invention taken in connection with the accompanying drawing in which:

FIG. 1 is a side elevational view of an assembly embodying the invention.

FIG. 2 is an enlarged cross-sectional view of FIG. 1 taken on the line 2—2 thereof, partly in elevation showing the identifying indexes.

FIG. 3 is an enlarged cross-sectional view of the device seen in FIG. 2 taken on the line 3—3 thereof showing the parts spaced apart prior to pressure molding.

FIG. 4 is a view similar to FIG. 3 which with the dowel and bolt removed to better show the part construction; and FIG. 5 is a side elevational view of the inventive dowel in FIG. 3.

Referring now to the drawing wherein like numerals refer to like and corresponding parts throughout the several views, the dowel and part assembly disclosed therein to illustrate the invention comprises, a first part 10 associated with a second part 11 interconnected by bolts 12 disposed therebetween with the inventive dowel 13 surrounding the bolt and socketed in the annular gripping socket 14 of the part 10 and in the tapered releasing socket 15 of the part 11 whereupon by tightening the parts 10 and 11 to initial face-to-face pressure contact, the dowel 13 is pressure formed in the socket 14, in the socket 15, and around the bolt 12 ironing out all differences and variances and establishing the dowel 13 in fixed relationship with the part 10; upon disassembly of the parts, the dowel 13 remains with the part 10 and releases from the part 11 providing a tapered shoulder 15 for leading the part 11 into the initial relationship with the part 10 on reassembly and retightening of the bolts 12. It is to be noted that the indexes 16 and 17 on the parts 10 and 11 respectively assure proper end for end positioning of the parts relative to each other.

More particularly, the preferred embodiment of the inventive dowel 13 comprises an annular head 14, a tapered frusto-conical shoulder 15, and a reduced neck 18 between the head 14 and shoulder 15 reducing flowable material in the space 19 between the parts to prevent dowel material flowing therebetween when tightening the bolts.

Part 10, FIG. 4, has an aperture 20 for receiving the bolt 12 and a counterbored socket 21 for receiving the head 14 of the dowel 13 and may also be provided with a head receiving area 22 to use Allen screws such as illustrated, but, it will be understood that regular nuts and bolts can be used with equal facility.

Part 11 has an aperture 23 surmounted by a tapered socket 24 and the aperture 23 may be threaded as shown for use in conjunction with an Allen screw or smooth face for use in conjunction with a convention bolt and nut.

It is to be noted that the part apertures 20 and 23 are axially aligned and that the annular head receiving socket 21 is disposed opposite the tapered shoulder receiving socket 24 with the sockets in axial alignment.

It is to be noted that in FIG. 3, which illustrates a loosened non-presurized assembly of the components parts, that the dowel ring 13 is so sized relative to the sockets 21 and 24, that a space 19 exists between the parts 10 and 11 and it is also to be noted that the reduced neck 18 is located in the space 19 area and this groove or reduced neck 18 backdrafts the material of the dowel 13 so that upon tightening the parts together no flow of material from the dowel 13 travels between parts 10 and 11 thereby permitting their face-to-face compression contact.

Upon tightening the bolt or screw 12 as illustrated in FIG. 3, a forming or molding pressure is placed on the pressure moldable material of the dowel 13 so that upon drawing the faces 30 and 31 respectively of the parts 10 and 11 together as seen in FIG. 2, the material of the dowel 13 is forced into pressure contact with the socket 21 in the head area 14 of the dowel and is forced into pressure molding conforming contact with the tapered socket 24 in the tapered shoulder 15 area of the dowel and also forced into pressure contact with the shank portion of the bolt 12, thus upon drawing the parts together from the position seen in FIG. 3 to the position seen in FIG. 2, the head portion 14 of the dowel is fixedly molded to the part 10 and in complete conformity with any variances or differences therein and the dowel shoulder 15 is releasably molded into conformity with the variances of the tapered socket 24. It will be understood that by loosening the bolt 12 and the bolt can be screwed out of the parts and dowel and the parts then separated by moving the shoulder 15 out of the socket 24 of part 11.

In operation, after the parts 10 and 11 are assembled as seen in FIG. 2, the assembled parts 10 and 11 can then be machined such as by drilling, milling, and grinding the bores 40 and 41 on a common axis; it is also obvious that other machining and finishing operations can be performed on the parts in the assembled relationship. After the machining has been completed the parts can be disassembled as hereinbefore set forth and then reassembled with the bores 40 and 41 still on their common axis due to the fact that the moldable material of the dowel 13 compensated differences and variances between the parts, so that upon reassembly the identical initial relationship is re-established.

It is obvious that the inventive dowel ring can be located in opposed sockets between various parts without the bolts 12 leading through the dowel ring and it is also obvious that under this circumstance that the aperture 32 in the dowel ring can be eliminated if desired. It is also obvious that the chamber or the socket 13 can be backdrafted, keyed, notched, or shaped otherwise than annular within the preview of the invention and it is also understood that the tapered socket 24 need not be necessarily frusto-conical within the perview of the invention.

The inventive moldable dowel with these features constitutes a compact, durable, and easily operated device providing substantially fool-proof means for accurately relocating disassembled parts to their initialed assembled relationship.

Although with the single embodiment of the invention has been shown described in detail, it is obvious that many changes may be made in the size, shape, detail, and arrangements for the various elements of the invention within the scope of the appended claims.

I claim:

1. A precision fitting, locating, and accurately relocating dowel ring which is self-adjusting for compensating differences and variances between adjacent parts with which the device is integrated facilitating accurately demountable and remountable assemblies comprising in combination a first part having a face and a bolt receiving aperture leading therethrough; a second part having a face and a bolt receiving aperture leading therethrough; said first and second part apertures being axially aligned with said faces disposed toward one another in opposed spaced relationship; said first part face having an annular counterbore concentrically surrounding said aperture forming an annular socket therein; said second part face having a frusto conical counterbore concentrically surrounding said aperture and opening outwardly toward said face forming an inwardly closing tapered socket therein; a dowel ring having an aperture axially aligned with said first and second part's apertures, an annular head on said dowel ring disposed in the annular socket of said first part, a frusto conical shoulder on said dowel ring disposed in the tapered socket of said second part and having a bottom end spaced above the bottom of said tapered socket; said dowel ring initially spacing said parts slightly apart; a reduced neck on said dowel ring in the area of the space between said parts; a bolt disposed between said parts and dowel having a head contacting one part and a threaded shank for engaging nut means on said other part; said bolt lying in said dowel and said parts axially aligned apertures; and nut means on said other part engaging said both threaded shank; said dowel ring being made of pressure moldable material; said dowel ring upon said bolt and nut means drawing said part faces together molding said dowel ring head and shoulder into said sockets accurately conforming to their deformities and taking a permanent set in said annular socket and a releasable set in said tapered socket so that upon removing said bolt said pieces are separable with said dowel ring head embedded in said annular socket of said first part with said dowel ring frusto conical shoulder projecting providing means for subsequently repositioning said second part relative to said first part accurately so that the parts upon reassembly are in the same relative position to one another as when first assembled; said dowel ring reduced neck portion eliminating flow of dowel ring material between said parts faces in drawing said part faces together to effect molding said dowel ring into conformity with said parts sockets.

2. A precision fitting, locating, and accurately relocating dowel ring which is self-adjusting for compensating differences and variances between adjacent parts with which the device is integrated facilitating accurately demountable and remountable assemblies comprising in combination a first part having a face and a bolt receiving aperture leading therethrough; a second part having a face and a bolt receiving aperture leading therethrough; said first and second part apertures being axially aligned with said faces disposed toward one another in opposed spaced relationship; said first part face having a counterbore surrounding said aperture forming a first socket therein; said second part face having a tapered counterbore surrounding said aperture opening outwardly toward said face forming an inwardly closing tapered socket therein; a dowel ring having an aperture axially aligned with said first and second part's apertures, a head on said dowel ring disposed in the first socket of said first part, a tapered shoulder on said dowel ring disposed in the tapered socket of said second part and having a bottom end spaced above the bottom of said tapered socket; said dowel ring initially spacing said parts slightly apart; a reduced neck on said dowel ring in the area of the space between said parts; and a bolt disposed between said parts having a head contacting one said part and a threaded shank for engaging nut means on said other part; said bolt lying in said dowel and said parts axially aligned apertures; said nut means on said other part engaging said bolt threaded shank; said dowel ring being made of pressure moldable material; said dowel ring upon said bolt and nut means drawing said part faces together molding said dowel ring head and shoulder into said sockets accurately conforming to their deformities and taking a permanent set in said first socket and a releasable set in said tapered socket so that upon removing said bolt and said pieces are separable with said dowel ring head embedded in said first socket of said first part with said dowel tapered shoulder projecting providing means for subsequently repositioning said second part relative to said first part accurately so that the parts upon reassembly are in the same relative position to one another as when first assembled; said dowel ring reduced neck portion eliminating flow of dowel ring material between said parts faces in drawing said part faces together to effect molding said dowel ring into conformity with said parts sockets.

3. A precision locating, and accurately relocating dowel which is self-adjusting for compensating differences and variances between adjacent parts with which it is integrated facilitating accurately demountable and remountable assemblies comprising in combination a first part having a face, a second part having a face, said first and second part faces being disposed toward one another in opposed relationship; said first part face having a counterbore forming a first cylindrical wall socket therein; said second part face having a tapered counterbore diverging outwardly toward and intersecting said face and forming an inwardly closing outwardly opening tapered socket therein; a dowel disposed between said parts, a cylindrical wall head on said dowel disposed in the cylindrical wall first socket of said first part, a tapered shoulder on said dowel of less axial length than said tapered counterbore and of complementary taper disposed in the tapered socket of said second part; said dowel having an intermediate neck cylindrical wall portion between said head and said tapered shoulder initially spacing said parts slightly apart; means for forcing said parts together in face to face contact; said dowel being made of material capable of cold flow; said means forcing said part faces together molding said dowel head and shoulder respectively into said sockets accurately conforming to their deformities and taking a permanent set in said first cylindrical wall socket and a releasable set in said outwardly opening tapered socket so that said pieces are separable with said dowel cylindrical wall head embedded in said cylindrical wall first socket of said first part with said dowel tapered shoulder projecting beyond said face of said first part providing means for subsequently repositioning said second part relative to said first part accurately.

4. A dowel comprising a head, a neck, and a shoulder below said neck;

said head having cylindrical side walls and said shoulder having relatively tapered frusto-conical side walls terminating in an outer end;

said head being adapted to bottom in a head socket in a first member said head socket having cylindrical side walls;

said shoulder being adapted to abut a shoulder socket in a second member having relatively outwardly opening tapered side walls which extend downwardly inwardly past said shoulder outer end forming a cavity below said shoulder outer end;

said neck being a portion of the dowel lying between said head and said shoulder initially spacing the socketed members apart;

said dowel being made of malleable material;

forcing the socketed members together forcing the material of said neck into said dowel head and into said dowel shoulder fixedly embedding said head in the head socket having cylindrical side walls and facing said tapered shoulder in the shoulder socket having outwardly opening tapered sidewalls in close conformity to the sockets with the head socket cavity above said neck and the tapered socket cavity below said neck absorbing excess material;

said head being non-removable from said cylindrical wall head socket and said shoulder being easily removable from said outwardly opening tapered socket for easy disassembly and accurate reassembly;

said dowel neck being reduced inwardly relative to said head and said shoulder to eliminate flow of material in said neck between said socketed members.

References Cited in the file of this patent

UNITED STATES PATENTS

| | | |
|---|---|---|
| 803,420 | Koegel | Oct. 31, 1905 |
| 2,560,413 | Carlson | July 10, 1951 |
| 2,635,338 | Dallenbach | Apr. 21, 1953 |
| 2,652,297 | Sterns et al. | Sept. 15, 1953 |
| 2,901,787 | Whistler et al. | Sept. 1, 1959 |

FOREIGN PATENTS

| | | |
|---|---|---|
| 146,328 | Sweden | July 27, 1954 |